United States Patent
Kanemaru et al.

(10) Patent No.: US 8,342,235 B2
(45) Date of Patent: Jan. 1, 2013

(54) COUNTER-FLOW HEAT EXCHANGER FOR VEHICLE AIR CONDITIONING SYSTEM

(75) Inventors: Junichi Kanemaru, Columbus, OH (US); Shinji Kakizaki, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 994 days.

(21) Appl. No.: 12/370,688

(22) Filed: Feb. 13, 2009

(65) Prior Publication Data
US 2010/0206528 A1 Aug. 19, 2010

(51) Int. Cl.
*F28D 7/06* (2006.01)
*F28F 9/02* (2006.01)

(52) U.S. Cl. ........................ 165/176; 165/174

(58) Field of Classification Search .......... 165/174, 165/175, 176, 153, 158
See application file for complete search history.

(56) References Cited

U.S. PATENT DOCUMENTS

| | | | | |
|---|---|---|---|---|
| 2,187,555 A * | 1/1940 | Flindt | | 165/70 |
| 2,612,349 A | 9/1952 | Lintern | | |
| 4,549,605 A * | 10/1985 | Sacca et al. | | 165/150 |
| 4,771,825 A * | 9/1988 | Chen et al. | | 165/151 |
| 5,236,336 A * | 8/1993 | Hitoshi | | 165/153 |
| 5,265,673 A * | 11/1993 | Hucsko | | 165/176 |
| 6,341,648 B1 * | 1/2002 | Fukuoka et al. | | 165/144 |
| 6,745,827 B2 | 6/2004 | Lee et al. | | |
| 7,222,667 B2 | 5/2007 | Fujiki et al. | | |
| 2008/0006226 A1 * | 1/2008 | Takeda et al. | | 122/18.1 |
| 2008/0006392 A1 * | 1/2008 | Hayasaka et al. | | 165/81 |
| 2009/0049861 A1 * | 2/2009 | Luo et al. | | 62/498 |

FOREIGN PATENT DOCUMENTS

JP          04-000189         6/1992

* cited by examiner

*Primary Examiner* — Tho V Duong
(74) *Attorney, Agent, or Firm* — Rankin Hill & Clark LLP (57) ABSTRACT

A counter-flow heat exchanger for a vehicle air conditioning system includes a first lateral tank having an inlet chamber and an outlet chamber. The first lateral tank includes an inlet port fluidly connected to the inlet chamber and an outlet port fluidly connected to the outlet chamber. The outlet port is positioned adjacent an uppermost portion of the first lateral tank for reducing air pockets. A second lateral tank is laterally spaced apart from the first lateral tank. A first set of tubes fluidly connects the inlet chamber of the first lateral tank to the second lateral tank. A second of tubes fluidly connects the second lateral tank to the outlet chamber of the first lateral tank.

19 Claims, 5 Drawing Sheets

COUNTER-FLOW HEAT EXCHANGER FOR VEHICLE AIR CONDITIONING SYSTEM

BACKGROUND

The present disclosure generally relates to an improved counter-flow heat exchanger for a vehicle air conditioning system, and more particularly relates to an improved counter-flow heat exchanger constructed to reduce the likelihood and/or size of air bubbles developing within the heat exchanger and/or to facilitate removal of any air bubbles within the heat exchanger.

Heat exchangers for vehicle air conditioning systems typically include a pair of spaced apart tanks with a plurality of spaced apart tubes extending therebetween to fluidly connect the tanks. A heat transfer fluid, such as water or coolant, is passed through the tubes between the spaced apart tanks while an air flow is passed between the spaced apart tubes. Heat from the heat transfer fluid is imparted to the air flow passing between the spaced apart tubes, which can then be used to target select areas of the vehicle's cabin through appropriate ducting. The heat transfer fluid is delivered to the heat exchanger at a first elevated temperature through an inlet port and exits the heat exchanger at a second lower temperature through an exit port (i.e., after its heat has been imparted to the air flow passing thereby). The locations of the inlet and outlet ports are often dependent on the type of heat exchanger employed (e.g., parallel flow, counter-flow, etc.) and the orientation of the heat exchanger within a particular air conditioning system (e.g., tanks spaced horizontally apart or tanks spaced vertically apart).

One concern with heat exchangers in vehicle air conditioning systems is the elimination of any air bubbles or pockets within the heat exchanger. Such air bubbles or pockets can have a deleterious effect of the heating efficiency of the heat exchanger. Another concern relates to layout considerations of the vehicle, which can impact the size of the heat exchanger, the orientation of the heat exchanger and/or the location of the inlet and outlet ports of the heat exchanger. Oftentimes, the air bubble or pocket concern competes with the layout considerations in a given vehicle design. For example, designing the heat exchanger of a particular size, orienting the heat exchanger in a particular position and/or requiring the inlet and outlet ports to face a certain direction can result in a heat exchanger that is prone to developing and capturing air bubbles or pockets. Conversely, designing an efficient heat exchanger that has few problems with air bubbles or pockets can result in a heat exchanger that severely limits layout options within the air conditioning system and/or the vehicle generally.

SUMMARY

According to one aspect, an improved counter-flow heat exchanger is provided for a vehicle air conditioning system. More particularly, in accordance with this aspect, the counter-flow heat exchanger includes a first lateral tank having an inlet chamber and an outlet chamber. The first lateral tank includes an inlet port fluidly connected to the inlet chamber and an outlet port fluidly connected to the outlet chamber. The outlet port is positioned adjacent an uppermost portion of the first lateral tank for reducing air pockets. A second lateral tank is laterally spaced apart from the first lateral tank. A first set of tubes fluidly connects the inlet chamber of the first lateral tank to the second lateral tank. A second set of tubes fluidly connects the second lateral tank to the outlet chamber of the first lateral tank.

According to another aspect, an improved heater core is provided for a vehicle air conditioning system. More particularly, in accordance with this aspect, the heater core includes a pair of horizontally spaced apart tanks, including an inlet/outlet tank and a reversing tank. The inlet/outlet tank has an inlet chamber and an outlet chamber disposed therein. A first set of tubes extends between the pair of horizontally spaced apart tanks and defines a fluid path from the inlet chamber of the inlet/outlet tank to the reversing tank. A second set of tubes extends between the pair of horizontally spaced apart tanks and further defines the fluid path from the reversing tank to the outlet chamber of the inlet/outlet tank. The outlet chamber has at least a portion arranged at a higher elevation than the inlet chamber.

According to still another aspect, an improved vehicle heat exchanger with counter-flow is provided. More particularly, in accordance with this aspect, the vehicle heat exchanger includes an inlet/outlet tank having an inlet port and an inlet chamber connected therewith, and further having an outlet port and an outlet chamber connected therewith. A reversing tank is laterally and horizontally spaced apart from the inlet/outlet tank. The reversing tank has a reversing chamber. Tubes connect the inlet chamber with the reversing chamber and connect the reversing chamber with the outlet chamber. The outlet chamber generally has an L-shape including a base portion and a height portion. The base portion forms an uppermost portion of the inlet/outlet tank elevated above the inlet chamber.

DETAILED DESCRIPTION

Figure 1:
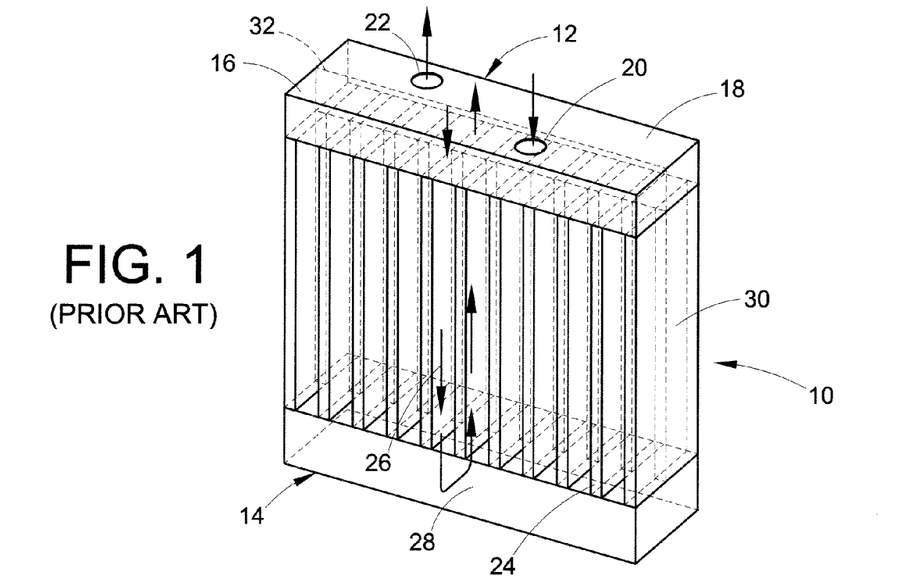
FIG. 1 is a schematic perspective view of a conventional counter-flow heat exchanger for a vehicle air conditioning system shown in a vertical orientation.

Referring now the drawings, wherein the showings are only for the purposes of illustrating one or more exemplary embodiments and not for limiting the same, FIG. 1 shows a conventional counter-flow heat exchanger 10 for a vehicle air conditioning system shown in a vertical orientation. More particularly, the heat exchanger 10 includes a pair of vertically spaced apart tanks, including an upper inlet/outlet tank 12 and a lower reversing tank 14. The heat exchanger 10 is said to be in a vertical orientation due to the orientation of the tanks 12, 14 relative to one another. That is, the tanks 12, 14 are vertically spaced apart and thus the heat exchanger 10 is in a vertical orientation. The upper tank 12 includes an inlet chamber 16 and an outlet chamber 18, which are separated from one another by a separator or separator wall 32. The upper tank 12 further includes an inlet port 20 fluidly connected to the inlet chamber 16 and an outlet port 22 fluidly connected to the outlet chamber 18.

The heat exchanger 10 additionally includes a first set of tubes 24 extending between the tanks 12, 14 and defining a fluid path 26 from the inlet chamber 16 and its inlet port 20 to a reversing chamber 28 of the lower reversing tank 14. A second set of tubes 30 extends between the tanks 12, 14 and further defines the fluid path 26 from the reversing tank 14 back to the upper tank 12, and particularly to the outlet chamber 18 of the upper tank 12.

As will be understood and appreciated by those skilled in the art, a heat transfer fluid (e.g., water, coolant, etc.) is introduced to the heat exchanger 10 through the inlet port 20. The heat transfer fluid passes from the inlet chamber 16 (to which it is delivered via the inlet port 20) to the reversing chamber 28 by the first set of tubes 24. In the reversing chamber 28, the flow direction of the heat transfer fluid is reversed and passed from the reversing tank 14 back to the upper tank 12 by the second set of tubes 30. In particular, the heat transfer fluid is sent back by the reversing tank 14 to the outlet chamber 18 of the upper tank 12. From the outlet chamber 18, the heat transfer fluid exits the heat exchanger 10 via the outlet port 22.

As is well known, an airflow can be passed between the spaced apart tubes of the first and second sets of tubes 24, 30. Heat is imparted to this airflow from the heat transfer fluid passing through the tubes 24, 30 as is also well known. With the inlet and outlet ports 20, 22 positioned on the upper tank 12 on a top or upper side thereof (and of the heat exchanger 10) fluid connections to these ports 20, 22 are required to be physically present immediately above the heat exchanger 10, which may or may not be desirable for a particular vehicle layout. However, this positioning of the inlet and outlet ports 20, 22 (i.e., positioned on a top or upper side of a vertically oriented heat exchanger) tends to limit or reduce the formation of air bubbles or pockets within the heat exchanger and/or removes any that do form.

Figure 2:
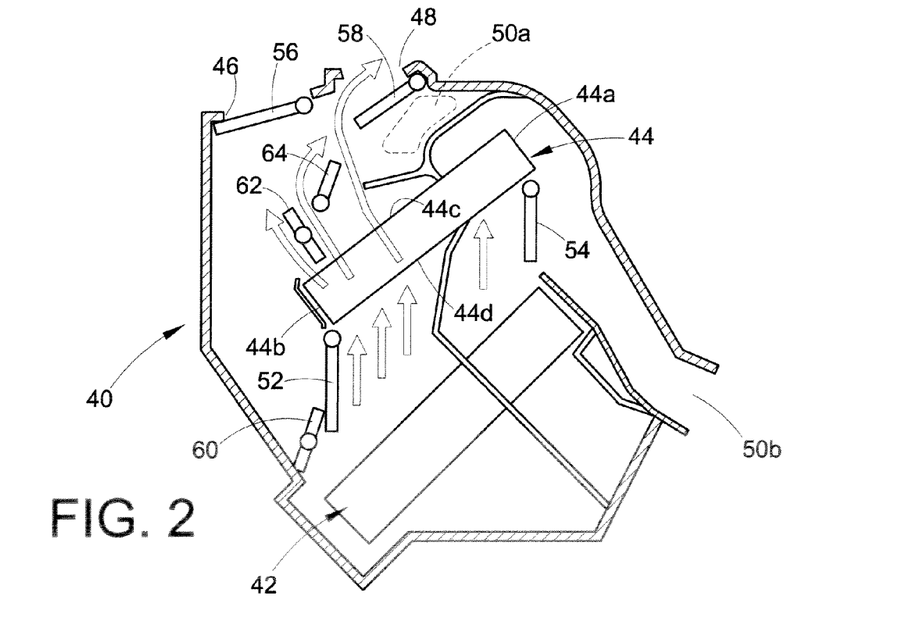
FIG. 2 is a schematic cross-section view of a vehicle air conditioning system having a heat exchanger and an evaporator.

FIG. 2 illustrates a vehicle air conditioning system 40 including an evaporator 42 and a heater element or core 44, which could be the heat exchanger 10 of FIG. 1. The system 40 delivers conditioned air to one or more of a defrost duct 48, passenger cabin vent ducts 46, and/or floor vent ducts 50a, 50b. Between the evaporator 42 and the heater core 44, a first air mix door 52 is disposed for selectively controlling airflow for the ducts 46, 48, 50a through the heater core 44. For example, in the illustrated position, the first air mix door 52 directs all air flow for the ducts 46, 48 through the heater core 44. Similarly, a second air mix door 54 can be disposed between the evaporator 42 and the heater core 44 for selectively controlling air flow through the heater core 44 that is directed to the duct 50b. In the illustrated position, the second air mix door 54 directs all air flow from the evaporator 42 that is directed to the duct 50b through the heater core 44. In other non-illustrated positions, the air mix doors 52, 54 can respectfully direct a varying amount of airflow from the evaporator 42 through the heater core 44, including directing no air flow through the heater core 44.

In the illustrated system 40, the defrost duct 48 can include a defrost duct door 58 for selectively controlling air flow allowed to enter the duct 48 (i.e., defrost airflow). Likewise, the passenger cabin vent duct 46 can include a vent door 56 that selectively controls airflow delivered to the duct 46 (i.e., vent air flow). Additional auxiliary doors 60, 62, 64 can be employed in the system 40 for more particularly controlling airflow therethrough to achieve desired proportions of airflow through the evaporator 42 and/or the heater core 44 that is to be delivered to one or more of the ducts 46, 48, 50a, 50b.

As shown in FIG. 2, the heater core 44 includes an upper lateral side 44a, a lower lateral side 44b, an upper longitudinal side 44c, and a lower longitudinal side 44d. When the heat exchanger 10 of FIG. 1 is used as the heater core 44 in the system 40 of FIG. 2, it is to be appreciated that the inlet and outlet ports 20, 22 of the heat exchanger 10 would be positioned on the upper lateral side 44a of the heater core 44. Accordingly, appropriate fluid connections to the inlet and outlet ports 20, 22 would extend from and connect to the upper lateral side 44a of the heater core 44. In some vehicle layouts, it may not be desirable to have the ports and the fluids connections therewith extending from the upper lateral side 44a of the heater core 44. For example, there may be other components of the vehicle that need to occupy the space immediately above the upper lateral side 44a or this space immediately above the upper lateral side 44a may need to be available for unobstructed airflow toward a vent, such as floor vent duct 50. Instead, it may be desirable to have a heater core 44 where the inlet and outlet ports are provided on a lateral face of the heater core 44, in which the tanks of the heater core would be horizontally spaced apart (i.e., a horizontal orientation) rather than vertically spaced apart as depicted in FIG. 1.

Figure 3:
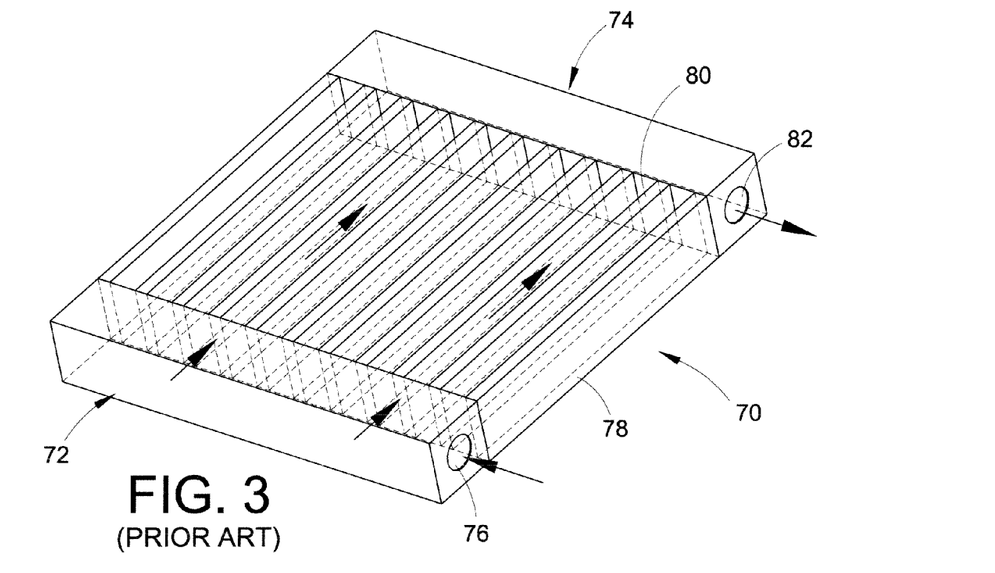
FIG. 3 is a schematic perspective view of a conventional parallel flow type heat exchanger.

With reference to FIG. 3, a known conventional heater core having inlet and outlet ports on a lateral face is the depicted parallel flow type heat exchanger 70. The heat exchanger 70 includes a lower tank 72 and an upper tank 74. An inlet port 76 is provided on a lateral face 78 of the heat exchanger 70 and is fluidly connected to a chamber defined by the lower tank 72. A single set of tubes 80 extend between the lower and upper tanks 72, 74 and fluidly connect the same. In particular, the set of tubes 80 fluidly connect the chamber of the lower tank 72 to a chamber of the upper tank 74. An outlet port 82 is also provided on the lateral face, and specifically disposed on the upper tank 74. With the inlet and outlet ports 76, 82 positioned on lateral face 78 of the heat exchanger 70 this heat exchanger 70 could be used as the heater core 44 of FIG. 2 in applications where it is desirable to have the fluid connections with the heater core 44 on a lateral face.

In operation, heat transfer fluid enters the heat exchanger 70 through the inlet port 76 of the lower tank 72, passes from the lower tank 72 to the upper tank 74, via the tubes 80, and exits the heat exchanger 70 through the outlet port 82. Like the heat exchanger 10, the tubes 80 of the heat exchanger 70 are spaced apart to allow an airflow to pass thereby to which heat is imparted from the heat transfer fluid passing through the tubes 80. One advantage of the heat exchanger 70 is that the outlet port 82 is positioned at an uppermost part of the heat exchanger 70, which is defined by the upper tank 74. This has the effect of preventing and/or removing any air bubbles or pockets that form or attempt to form in the heat exchanger 70. A drawback of the heat exchanger 70 is that it lacks counterflow and is difficult to achieve uniform heat transfer from the tubes 80 to the air flow passing thereby.

Figure 4:
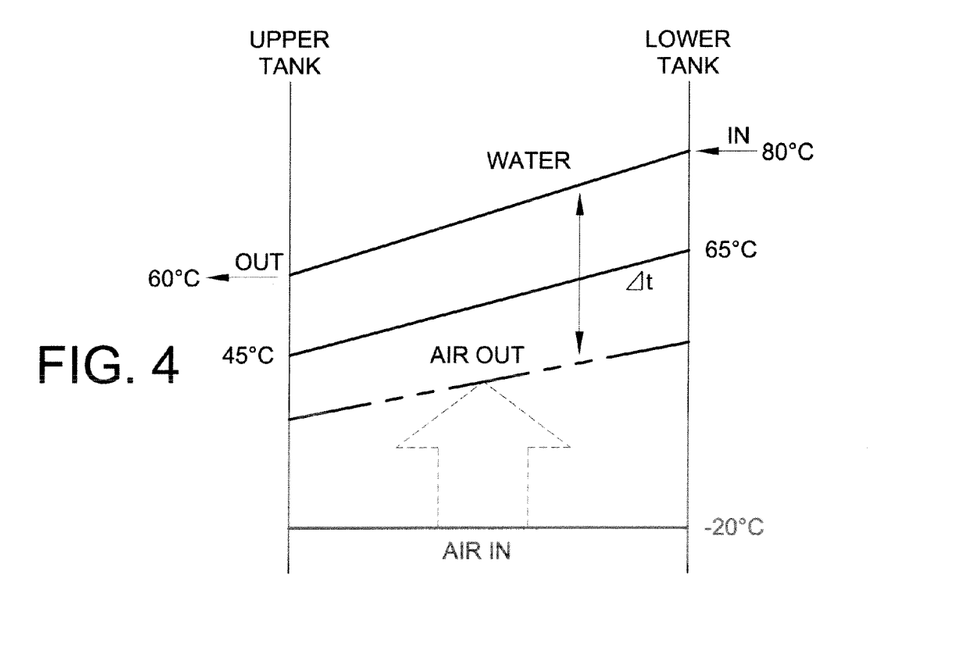
FIG. 4 is a temperature chart corresponding to the horizontally oriented parallel flow type heat exchanger of FIG. 3.

More particularly, as illustrated in FIG. 4, heat transfer fluid can enter the inlet port 76 at a temperature of 80° C., for example. At the same time, an air flow exiting an evaporator enters the heat exchanger 70 at a temperature of −20° C., for example. As heat is removed from the heat transfer fluid in the tubes 80 carrying the heat transfer fluid between the lower tank 72 and the upper tank 74, the heat transfer fluid drops in temperature from 80° C. to 60° C., for example. The airflow exiting the heat exchanger 70, however, is not uniformly heated by the heat exchanger. Rather, as shown in FIG. 4, the airflow immediately adjacent the lower tank 72 increases in temperature from −20° C. to 65° C., for example. In contrast, airflow adjacent the upper tank 74 enters the heat exchanger 70 at −20 C and is heated only to 45° C., for example. Thus, the air flow exiting the heat exchanger 70 is not uniformly heated (e.g., a 20° C. temperature differential can occur across air flow passing through the heat exchanger 70).

Figure 5:
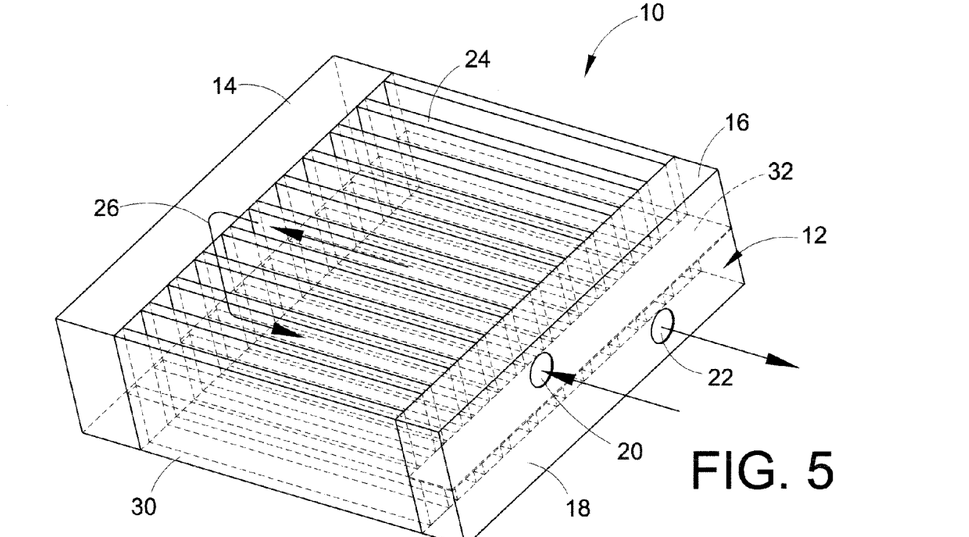
FIG. 5 is a schematic perspective view of the heat exchanger of FIG. 1 shown in a horizontal orientation.

Another option is to install the heat exchanger 10 of FIG. 1 in a rotated position as shown in FIG. 5 (i.e., a horizontal orientation). More particularly, the heat exchanger 10 can be rotated so that the upper and lower tanks 12, 14 become horizontally spaced apart first and second tanks. In this orientation, the first set of tubes 24 forms, along with portions of the tanks 12, 14, the upper longitudinal side 44c of the heater core 44 when utilized in the vehicle air conditioning system 40 of FIG. 2. In this orientation, the inlet and outlet ports 20, 22 would be positioned on a lateral face of the heat exchanger 10 permitting use in applications where fluid connections are preferred to the lateral side or face of the heater core 44.

Figure 6:
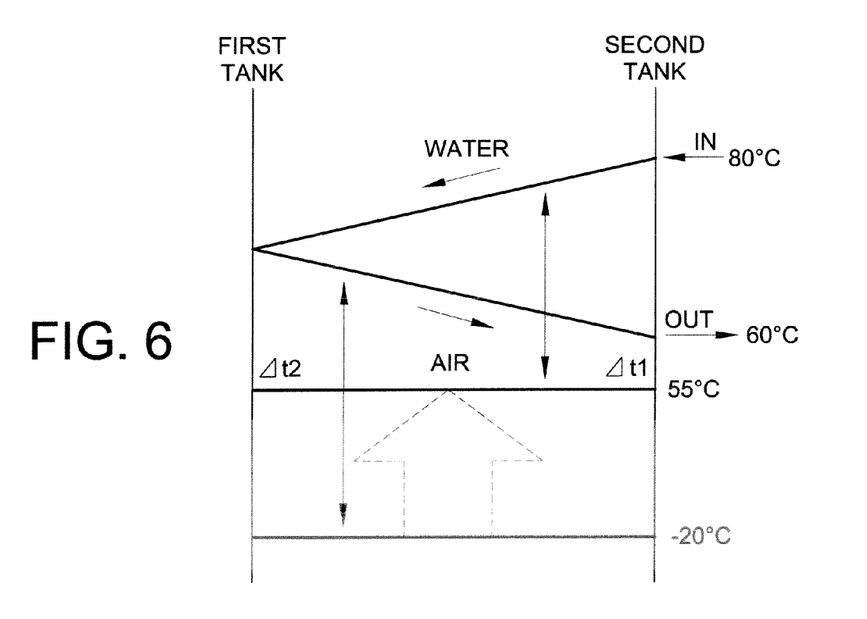
FIG. 6 is a temperature chart corresponding to the horizontally oriented counter flow heat exchanger of FIG. 5.

With additional reference to FIG. 6, by way of example only, heat transfer fluid can enter port 20 of the heat exchanger 10 (when in the horizontal orientation of FIG. 5) at a temperature of 80° C. and, at the same time, air flow can enter the heat exchanger at a temperature of −20° C. As heat is removed from the heat transfer fluid passing through the tubes 24, 30 in a counterflow pattern, the heat transfer fluid drops in temperature from 80° C. to 60° C., for example. As shown, the air flow passing through the horizontally oriented heat exchanger 10 is generally uniformly heated from 20° C. to 55° C., for example. That is, air flow passing adjacent the first tank 12 is heated about the same amount or degree by the horizontally oriented heat exchanger 10 as air flow passing adjacent to second tank 14.

Figure 7:
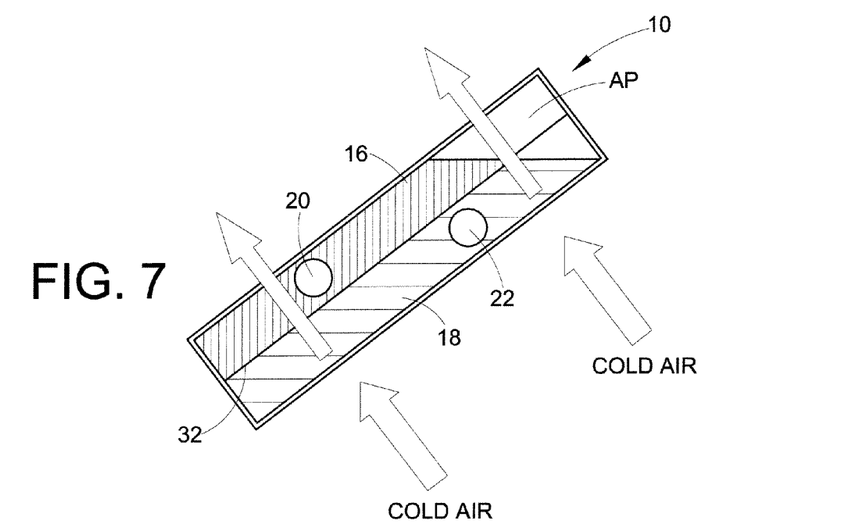
FIG. 7 is a cross-section view of the heat exchanger of FIG. 5 showing an air pocket formed therein.

With additional reference to FIG. 7, a problem with using the heat exchanger 10 in the horizontal orientation in a vehicle air conditioning system, such as system 40, is that air bubbles or pockets (e.g., air pocket AP) are likely to form and remain within the heat exchanger 10. This is due, at least in part, to the location of the outlet port 22 being at an elevation that is lower than an uppermost portion of the heat exchanger 10 (the uppermost portion being the location at which the air pocket AP forms). Air bubbles or pockets, such as air pocket AP can reduce the efficiency and/or uniform heating ability of the heat exchanger 10. Relocating the outlet port 22 on the heat exchanger 10, particularly on the outlet chamber 18 to which the outlet port 22 is fluidly connected, would result in little improvement because a portion of the inlet chamber 16 would still remain as the uppermost portion of the heat exchanger 10. Therefore, air pockets could still form.

Figure 8:
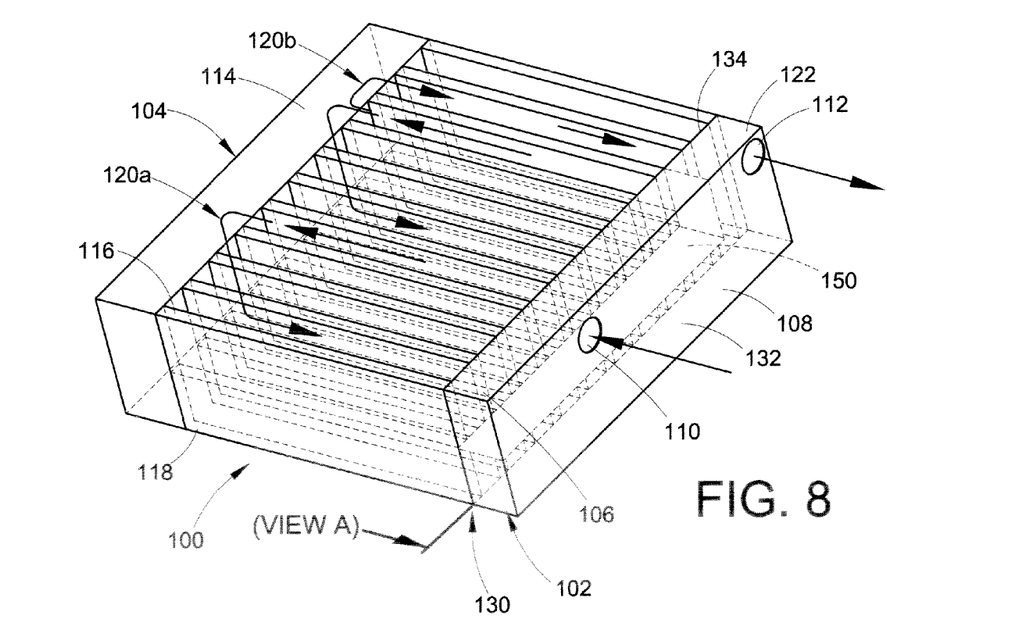
FIG. 8 is a schematic perspective view of an improved heat exchanger for a vehicle air conditioning system shown in a horizontal orientation, the heat exchanger having an inlet/outlet tank, a reversing tank and tubes fluidly connecting the tanks.

With reference to FIG. 8, an improved counter-flow heat exchanger 100 is illustrated for a vehicle air conditioning system, such as the air conditioning system 40 illustrated in FIG. 2. The heat exchanger 100, which can also be referred to as a heater element or core, includes a pair of horizontal y spaced apart tanks 102, 104. In particular, the pair of horizontally spaced apart tanks include a first lateral inlet/outlet tank 102 and a second lateral reversing tank 104. The illustrated heat exchanger 100 is in a horizontal orientation due to the tanks 102, 104 being horizontally spaced apart (i.e., the second lateral tank 104 being horizontally or laterally spaced apart from the first lateral tank 102). The first lateral tank 102 has an inlet chamber 106 and an outlet chamber 108 disposed therein. More specifically, the first tank 102 has an inlet port 110 and the inlet chamber 106 connected therewith, and further has an outlet port 112 and the outlet chamber 108 connected therewith. The inlet port 110 is disposed on the first lateral tank 102 and is fluidly connected to the inlet chamber 106; likewise, the outlet port 112 is disposed on the first tank 102 and is fluidly connected to the outlet chamber 108. The second lateral tank 104 has or defines a reversing chamber 114.

A plurality of tubes 116, 118 extend generally horizontally between the laterally spaced apart tanks 102, 104. The tubes 116, 118 connect the inlet chamber 106 with the reversing chamber 114 and connect the reversing chamber 114 with the outlet chamber 108. More specifically, a first set of tubes 116 fluidly connects the inlet chamber 106 of the first lateral tank 102 to the second lateral tank 104 and a second set of tubes 118 fluidly connects the second lateral tank 104 to the outlet chamber 108 of the first lateral tank 102. Thus, the first set of tubes 116 extend between the horizontally spaced apart tanks 102, 104 and define a fluid path 120 from the inlet chamber 106 of the first lateral tank 102 to the reversing tank 104 and the second set of tubes 118 extend between the tanks 102, 104 to further define the fluid path 120 from the reversing tank 104 to the outlet chamber 108 of the first tank 102. As will be described in more detail below, the outlet port 112 is positioned adjacent an uppermost portion 122 of the first lateral tank 102 for reducing and/or removing air pockets or bubbles. That is, the outlet chamber 108 has at least a portion arranged at a higher elevation than the inlet chamber 106, which permits the outer chamber 108 to form the uppermost portion of the heat exchanger 100 and allows the location of the outlet port 112 to be disposed on this uppermost portion.

Figure 9:
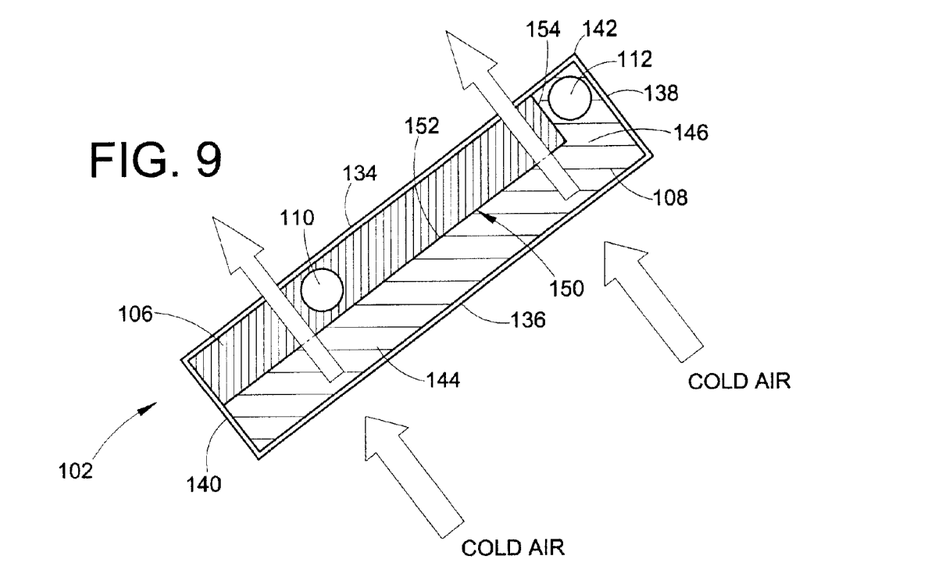
FIG. 9 is a schematic cross-section view of the heat exchanger of FIG. 8.
Figure 10:
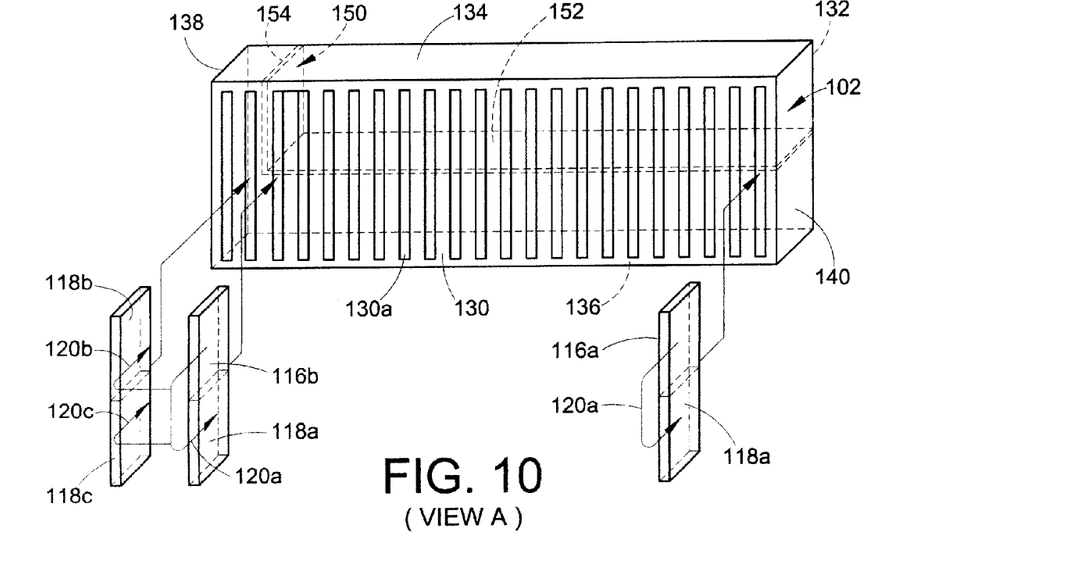
FIG. 10 is a schematic perspective view of the inlet/outlet tank taken at VIEW A of FIG. 8 showing tube ports on one side of the inlet/outlet tank and showing an exploded view of exemplary ones of the tubes.

With additional reference to FIGS. 9 and 10, the first lateral tank 102 includes a first wall or face 130 to which the first and second sets of tubes 116, 118 are connected and an opposite second wall or face 132 in or through which the inlet and outlet ports 110, 112 are defined (i.e., the second face 132 faces away from the tubes 116, 118). More particularly, the first wall 130 has a plurality of tube ports 130a fluidly connected to the tubes 116, 118. The first lateral tank 102 further includes spaced apart longitudinal sides 134, 136 extending between the first and second faces 130, 132 and spaced apart transverse sides 138, 140 also extending between the first and second faces 130, 132. Thus the chambers 106,108 extend horizontally between the walls 130,132 which are horizontally spaced apart. The transverse sides include a first or upper transverse side 138 and a second or lower transverse side 140. As best shown in FIG. 9, the outlet port 112 is positioned adjacent the upper longitudinal side 134 and adjacent the upper transverse side 138. In particular, the outlet port 112 is positioned adjacent an intersection 142 between the upper longitudinal side 134 and the upper transverse side 138. As illustrated, and particularly suited for the system 40 of FIG. 2 (though also suitable for other vehicle air conditioning systems), the lateral tanks 102, 104 are angularly oriented such that the intersection 142 forms the uppermost portion of the first lateral tank 102 and the fluid connections with the inlet and outlet parts 110, 112 are positioned adjacent longitudinal side 134.

The outlet port 112 is able to be positioned adjacent the intersection 142 because at least a portion of the outlet chamber 108 is positioned adjacent the intersection 142. More specifically, the outlet chamber 108 includes a first portion 144 disposed adjacent and along the lower longitudinal side 136 and a second portion 146 disposed adjacent and along the upper transverse side 138. The second portion 146, in the illustrated embodiment, extends between the longitudinal sides 134, 136. As shown, the inlet port 110 can be positioned adjacent the upper longitudinal side 134 and spaced apart from the transverse sides 138, 140. The outlet chamber 108 generally has an L-shape with the second portion 146 thereof forming a base of the L-shape and the first portion 144 forming a height of the L-shape. The second or base portion 146 of the outlet chamber 108 forms the uppermost portion 122 of the first lateral tank 102, which is elevated above or arranged at a higher elevator than the inlet chamber 106, at least in part A separator 150 is disposed within the first tank 102 to define, together with interior wall surfaces of the first tank 102, the inlet chamber 106 and the outlet chamber 108 (which are fluidly separated from one another by the separator 150). The separator 150 spans between the walls 130, 132. As shown, the separator 150 has a first section 152 dividing the first lateral tank 102 longitudinally between the inlet chamber 106 and the outlet chamber 108 and a second section 154 angularly disposed relative to the first section 152. The second section 154 at least partially defines the second or uppermost portion 146 of the outlet chamber 108. As shown, the separator 150 generally has an L-shape with the second section 154 of the L-shape and the first section 152 forming a height of the L-shape. The inlet chamber 106 is formed along an adjacent the longitudinal side 134 of the tank 102 and the L-shape of the separator 150 positions the second portion 146 of the outlet chamber 108 along the same longitudinal side 134. As shown, the inlet and outlet ports 110, 112 are both positioned on the second face 132 adjacent the longitudinal side 134 of the tank 102.

As illustrated, the first set of tubes 116 extend and fluidly connect from the inlet/outlet tank 102 to the reversing tank 104. The second set of tubes 118 extend and fluidly connect from the reversing tank 104 to the inlet/outlet tank 102. The first set of tubes 116 includes tubes 116a, 116b distributed along the longitudinal length of the separator 150, particularly the first section 152 thereof. The tubes 116b are those (e.g., the closest one or two) adjacent the second section 154. The second set of tubes 118 includes tubes 118a distributed along the longitudinal length of the separator 150, particularly the first section 152 thereof, and disposed below the tubes 116a, 116b. A flow path 120a is defined for fluid passing from the inlet chamber 106 of the inlet/outlet tank 102, through the tubes 116a, 116b, to the reversing tank and back to the outlet chamber 108 of the inlet/outlet tank 102, through the tubes 118a.

The second set of tubes 118 further includes tubes 118b disposed above the first section 152 and on an opposite side of the second section 154 than the tubes 118a, and tubes 118c disposed below the first section 152 and on the same side of the second section as the tubes 118b. Further flow paths 120b, 120c are defined by the tubes 116b and tubes 118b and 118c. In particular, flow path 120b is formed for fluid passing from the inlet chamber 106 through tube or tubes 116b to the reversing tank 114 and then back to the outlet chamber 108 through the tubes 118b. Similarly, flow path 120c is formed for fluid passing from the inlet chamber 106 through tube or tubes 116b to the reversing tank 114 and then back to the outlet chamber 108 through the tubes 118c. This arrangement facilitates removal of any air bubbles from the heat exchanger 100 because tubes 118b, 118c (and particularly tubes 118c) are aligned with the outlet port 112.

One advantage of the improved counter-flow heat exchanger 100 is that it can be used in the horizontal orientation in a vehicle air conditioning system, such as the system 40 of FIG. 2, without susceptibility to the formation of air bubbles or pockets, which are known to reduce the efficiency of the heat exchanger (i.e., air bubbles or pockets are not likely to form in the heat exchanger 100 when used in the horizontal orientation). In particular, due to the outlet chamber 108 having a portion 146 that is elevated higher than the inlet chamber 106 and forming the uppermost portion of the tank 102, the outlet port 112 can be disposed in the position illustrated. This tends to reduce or eliminate the formation of air bubbles or pockets within the heat exchanger 100. Should any air bubbles or pockets develop in the heat transfer fluid, such air pockets or bubbles are not likely to become stuck within the heat exchanger 100. Accordingly, the counter-flow heat exchanger 100 allows for generally uniform heating of the air flow passed therethrough, but eliminates a problem with respect to air bubbles or pockets.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A counter-flow heat exchanger for a vehicle air conditioning system, comprising:
    a first lateral tank having an inlet chamber and an outlet chamber, said first lateral tank including an inlet port fluidly connected to said inlet chamber and an outlet port fluidly connected to said outlet chamber, said outlet port positioned adjacent an uppermost portion of said first lateral tank for reducing air pockets;
    a second lateral tank laterally spaced apart from said first lateral tank;
    a first set of tubes fluidly connecting said inlet chamber of said first lateral tank to said second lateral tank; and
    a second set of tubes fluidly connecting said second lateral tank to said outlet chamber of said first lateral tank,
    wherein said first lateral tank includes a first face and a second, opposite face, spaced apart longitudinal, opposite sides extending between said first and second faces and spaced apart transverse, opposite sides extending between said first and second faces, said longitudinal sides include an upper longitudinal side and a lower longitudinal side, said outlet port positioned adjacent said upper longitudinal side, and said outlet chamber includes a first portion disposed adjacent and along said lower longitudinal side and a second portion angularly disposed relative to said first portion and disposed adjacent and along an upper one of said transverse sides and extending between said longitudinal sides.

2. The counter-flow heat exchanger of claim 1 wherein said first set of tubes and said second set of tubes extend generally horizontally between said first and second lateral tanks.

3. The counter-flow heat exchanger of claim 1 wherein said first lateral tank includes said first face to which said first and second sets of tubes are connected and said second, opposite face in which said inlet and outlet ports are defined.

4. The counter-flow heat exchanger of claim 1 wherein said inlet port is positioned adjacent said upper longitudinal side and said first set of inlet tubes are generally disposed adjacent and along said upper longitudinal side.

5. The counter-flow heat exchanger of claim 1 wherein said outlet chamber generally has an L-shape with said second portion forming a base of said L-shape and said first portion forming a height of said L-shape.

6. The counter-flow heat exchanger of claim 1 wherein said transverse sides include an upper transverse side and a lower transverse side, said outlet port positioned adjacent said upper transverse side.

7. The counter-flow heat exchanger of claim 1 wherein said outlet port is positioned adjacent an intersection between one of said longitudinal sides and one of said transverse sides.

8. The counter-flow heat exchanger of claim 7 wherein said lateral tanks are angularly oriented such that an intersection between said one of said longitudinal sides and said one of said transverse sides forms said uppermost portion of said first lateral tank.

9. The counter-flow heat exchanger of claim 1 further including a separator disposed in said first lateral tank to define, together with interior wall surfaces of said first lateral tank, said inlet chamber and said outlet chamber, said separator having a first section dividing said first lateral tank longitudinally between said inlet chamber and said outlet chamber and a second section angularly disposed relative to said first section.

10. The counter-flow heat exchanger of claim 9 wherein said separator generally has an L-shape with said second section forming a base of said L-shape and said first section forming a height of said L-shape.

11. The counter-flow heat exchanger of claim 10 wherein said inlet chamber is formed along and adjacent said upper longitudinal side of said first lateral tank and said L-shape of said separator positions a portion of said outlet chamber along said upper longitudinal side.

12. The counter-flow heat exchanger of claim 11 wherein said inlet port and said outlet port are defined on said second face of said first lateral tank facing away from said first and second sets of tubes, said inlet port and said outlet port both positioned on said second face adjacent said upper longitudinal side.

13. A heater core for a vehicle air conditioning system, comprising:
a pair of horizontally spaced apart tanks including an inlet/outlet tank and a reversing tank, said inlet/outlet tank having an inlet chamber and an outlet chamber disposed therein;
a first set of tubes extending between said pair of horizontally spaced apart tanks and defining a fluid path from said inlet chamber of said inlet/outlet tank to said reversing tank; and
a second set of tubes extending between said pair of horizontally spaced part tanks and further defining said fluid path from said reversing tank to said outlet chamber of said inlet/outlet tank, said outlet chamber having a first portion arranged at a higher elevation than said inlet chamber, and
a separator is disposed within said inlet/outlet tank to separate said inlet/outlet tank into said inlet chamber and said outlet chamber, said separator spanning between horizontally spaced apart first and second walls and shaped to position said inlet chamber directly above a second portion of said outlet chamber.

14. The heater core of claim 13 further including:
an inlet port defined through a wall of said inlet/outlet tank to fluidly connect to said inlet chamber; and
an outlet port defined through a wall of said inlet/outlet tank at a location of said portion of said outlet chamber arranged at said higher elevation to fluidly connect to said outlet chamber and thereby reduce the likelihood of air bubbles forming in said inlet/outlet tank.

15. The heater core of claim 13 wherein said outlet chamber extends horizontally between said horizontally spaced apart walls, including a said first wall having a plurality of tube ports fluidly connected to said second set of tubes and a said second, opposite wall, said outlet chamber generally has an L-shape including a base portion and a height portion, said base portion includes said first portion of said outlet chamber arranged at said higher elevation and said height portion includes said second portion of said outlet chamber.

16. The heater core of claim 15 wherein said separator is L-shaped.

17. The heater core of claim 13 wherein said pair of horizontally spaced apart tanks are angularly disposed.

18. A vehicle heat exchanger with counter-flow, comprising:
an inlet/outlet tank having an inlet port and an inlet chamber connected therewith, and further having an outlet port and an outlet chamber connected therewith;
a reversing tank laterally and horizontally spaced apart from said inlet/outlet tank, said reversing tank having a reversing chamber;
tubes connecting said inlet chamber with said reversing chamber and connecting said reversing chamber with said outlet chamber; and
wherein said outlet chamber generally has an L-shape including a base portion and a height portion, said base portion forming an uppermost portion of said inlet/outlet tank elevated above said inlet chamber, and said inlet chamber has a rectangular shape and is positioned directly above said height portion of said outlet chamber.

19. The vehicle heat exchanger of claim 18 wherein said tubes include:
a first set of tubes extending from and fluidly connecting said inlet chamber to said reversing chamber;
a second set of tubes extending from and fluidly connecting said reversing chamber to said outlet chamber;
a first fluid path defined by tubes of said first and second sets of tubes that are disposed along said base portion;
at least a second fluid path defined by tubes of said first set of tubes disposed adjacent said height portion and tubes of said second set of tubes connected to said height portion of said outlet chamber.

* * * * *